United States Patent

Morris, Jr. et al.

[11] Patent Number: 5,237,421
[45] Date of Patent: Aug. 17, 1993

[54] SHUTDOWN SYSTEM IN A TELEVISION RECEIVER

[75] Inventors: Robert E. Morris, Jr.; Gene H. Johnson, both of Indianapolis, Ind.

[73] Assignee: Thomson Consumer Electronics, Inc., Indianapolis, Ind.

[21] Appl. No.: 978,063

[22] Filed: Nov. 18, 1992

Related U.S. Application Data

[63] Continuation of Ser. No. 571,726, Aug. 27, 1990.

[51] Int. Cl.$^5$ .............................................. H04N 5/68
[52] U.S. Cl. ...................................... 358/190; 315/411
[58] Field of Search ................. 358/190, 243, 220, 63; 315/411; 361/75; 363/50

[56] References Cited

U.S. PATENT DOCUMENTS

| | | | |
|---|---|---|---|
| 3,544,720 | 12/1970 | Corderman | 179/1 |
| 3,555,358 | 1/1971 | Gibbs | 317/16 |
| 3,659,218 | 4/1972 | Haneda | 330/207 |
| 3,691,427 | 9/1972 | Honda et al. | 317/31 |
| 3,731,153 | 5/1973 | Nishimoto | 317/33 |
| 3,814,988 | 6/1974 | Ito | 317/31 |
| 3,840,820 | 10/1974 | Kawada | 330/207 |
| 3,912,981 | 10/1975 | Tsurushima | 317/33 |
| 3,916,321 | 10/1975 | Morse | 325/478 |
| 4,010,402 | 3/1977 | Miyata | 361/56 |
| 4,181,895 | 1/1980 | Yoshida | 330/279 |
| 4,185,234 | 1/1980 | Baker | 358/190 |
| 4,288,831 | 9/1981 | Dolikian | 363/50 |
| 4,292,654 | 9/1981 | Steckler et al. | 315/411 |
| 4,641,064 | 2/1987 | Testin et al. | 315/411 |
| 4,754,206 | 6/1988 | Sorensen | 315/411 |
| 4,763,046 | 8/1988 | Sheikholeslami et al. | 358/220 |
| 4,841,406 | 6/1989 | Stierberger | 358/243 |
| 4,916,366 | 4/1990 | Wilber et al. | 358/190 |

OTHER PUBLICATIONS

British Provisional Patent Application No. 8,929,103.3.

Primary Examiner—James J. Groody
Assistant Examiner—Glenton B. Burgess
Attorney, Agent, or Firm—Joseph S. Tripoli; Peter M. Emanuel; Frederick A. Wein

[57] ABSTRACT

In a television receiver the voltage applied to the loudspeaker from the audio amplifier is low pass filtered and coupled to a threshold detector. Normal audio is attenuated so that the detector is not tripped, but steady DC is passed through the filter and trips the detector. The output of the detector is coupled to the X-ray protection circuit of the receiver which acts to shut the receiver "off".

12 Claims, 4 Drawing Sheets

SHUTDOWN SYSTEM IN A TELEVISION RECEIVER

This is a continuation of application Ser. No. 07/571,726, filed Aug. 27, 1990.

BACKGROUND

The present invention relates to a protective circuit for a load, and in particular, to a protective circuit for a load DC coupled to the output of a push-pull class AB or class B amplifier powered from a "split voltage" power supply.

Conventional amplifiers utilized in audio systems not using output transformers are often arranged in a "push-pull" amplifier configuration having a pair of transistors in the output stage which are connected in series across a single voltage power supply in what is commonly called a "totem pole" configuration. In such a case, the output signal is supplied to a loudspeaker coupled between the junction of the pair of output transistors and ground through a relatively large coupling capacitor, which for a consumer product, typically is an electrolytic capacitor, which for a consumer product, typically is an electrolytic capacitor. Such an output coupling capacitor prevents the DC voltage at the junction of the output transistors, which is at about one-half the power supply voltage above ground, from being applied to the loudspeaker. However, low frequency audio signals such as bass signals may be substantially attenuated by the coupling capacitor, and thus will not be reproduced by the loudspeaker. Additionally, such a coupling capacitor could be what is commonly called a "non-polarized" electrolytic capacitor in order that the high treble frequency signals are not attenuated by the inductive reactance caused by the internal coil winding of the capacitor plates. Such a "non-polarized" electrolytic capacitor is much more expensive and larger in size for a comparable value of capacitance and voltage rating than a standard "polarized" electrolytic capacitor.

An alternative approach which avoids the disadvantages discussed above with respect to an output coupling capacitor is to use a "split voltage" power supply having equal plus and minus power supply voltages with respect to ground. In this case the output transistors to be adjusted so that the junction point of the transistors is held substantially at DC ground potential. Thus, the loudspeaker can be directly coupled between the junction point of the transistor and ground without requiring an output coupling capacitor since both sides of the loudspeaker are at substantially at the same DC potential of ground and the loudspeaker will not receive any DC voltage. As a consequence, the coupling capacitor can be eliminated and audio signals of very low bass frequencies can be coupled to the loudspeaker substantially unattenuated. That latter feature is of particular importance in higher-power audio systems which typically have larger loudspeakers capable of improved reproduction of the bass frequency signals.

One risk of such a direct-coupling of the loudspeaker to the junction of the output amplifier transistors is that a DC voltage can be applied to the output terminal and to the loudspeaker if a fault occurs in the amplifier. In a typical "single voltage" power supply system, the output coupling capacitor will block such fault producing Dc voltages from the loudspeaker, unless the coupling capacitor itself fails. In any event, such an output DC voltage can damage the loudspeakers.

Some prior art amplifiers provide fuses either between the output transistors and the power supply, or in series with the loudspeaker, or both, to protect against excessive currents in the loudspeakers due to DC voltages. However, fuses are difficult to size properly since they must also carry signal currents, and may "blow" even when a fault condition does not exist. Additionally, even quick acting fuses often will not operate with sufficient speed to protect the output transistors from being damaged.

Another approach is to use a "DC detector" circuit to detect a fault causing a DC voltage to be coupled to the loudspeaker and to shut down the amplifier before damage has occurred. One such a detector is shown in U.S. Pat. No. 4,010,402 of Miyata. Such a circuit provides a low frequency low pass filter to drive a threshold detector for actuating a relay or silicon controlled rectifier (SCR) for respectively disconnecting or shunting the loudspeaker.

Television receivers are often provided with various safety mechanisms. Upon detection of an unsafe condition, a number of courses of action can be taken. If a microprocessor is used, the microprocessor can be programmed to shutdown the primary power supply and to attempt to turn the receive back on a predetermined number of times. If the fault is still detected after the predetermined number of tries, then the microprocessor will keep the receiver turned off. Alternatively, a "safety" circuit an just turn the set "off" and keep it "off" upon detection of a fault. The latter type of circuit is used in the TX-81 chassis of Thomson S.A. of France. Specifically, the chassis is provided with an X-ray protection circuit which is actuated to shutdown the horizontal deflection circuit, and in particular, the horizontal output transistor, upon detection of a fault in a capacitor in the vertical deflection section where such a fault, if allowed to continue, could cause damage. This shutdown of the horizontal deflection circuit shuts down a secondary power supply powered from the flyback transformer. In the TX-81 chassis, the secondary power supply supplies power to at least the vertical deflection section and the audio section. Such a circuit for the TX-81 chassis is disclosed in British Provisional Application No. 8,929,103.3.

SUMMARY OF THE INVENTION

Briefly, the present invention concerns a shutdown system responsive to fault detection in an audio power amplifier of a television system and which takes particular advantage of protections circuits used to prevent damage from other faults. In the preferred embodiment, the voltage applied to the loudspeaker from the audio amplifier is coupled to a DC detector in which it is low pass filtered and coupled to a threshold detector. Normal audio is attenuated so that the detector is not tripped, but steady DC is passed through the filter and trips the detector. The output of the detector is coupled to the X-ray protection circuit of the receiver which shuts the receiver "off" when an audio fault is detected.

DESCRIPTION OF THE DRAWINGS

In the following description of the invention, reference should be made to the accompanying drawings wherein.

DETAILED DESCRIPTION OF THE PREFERRED EMBODIMENT

Figure 1:
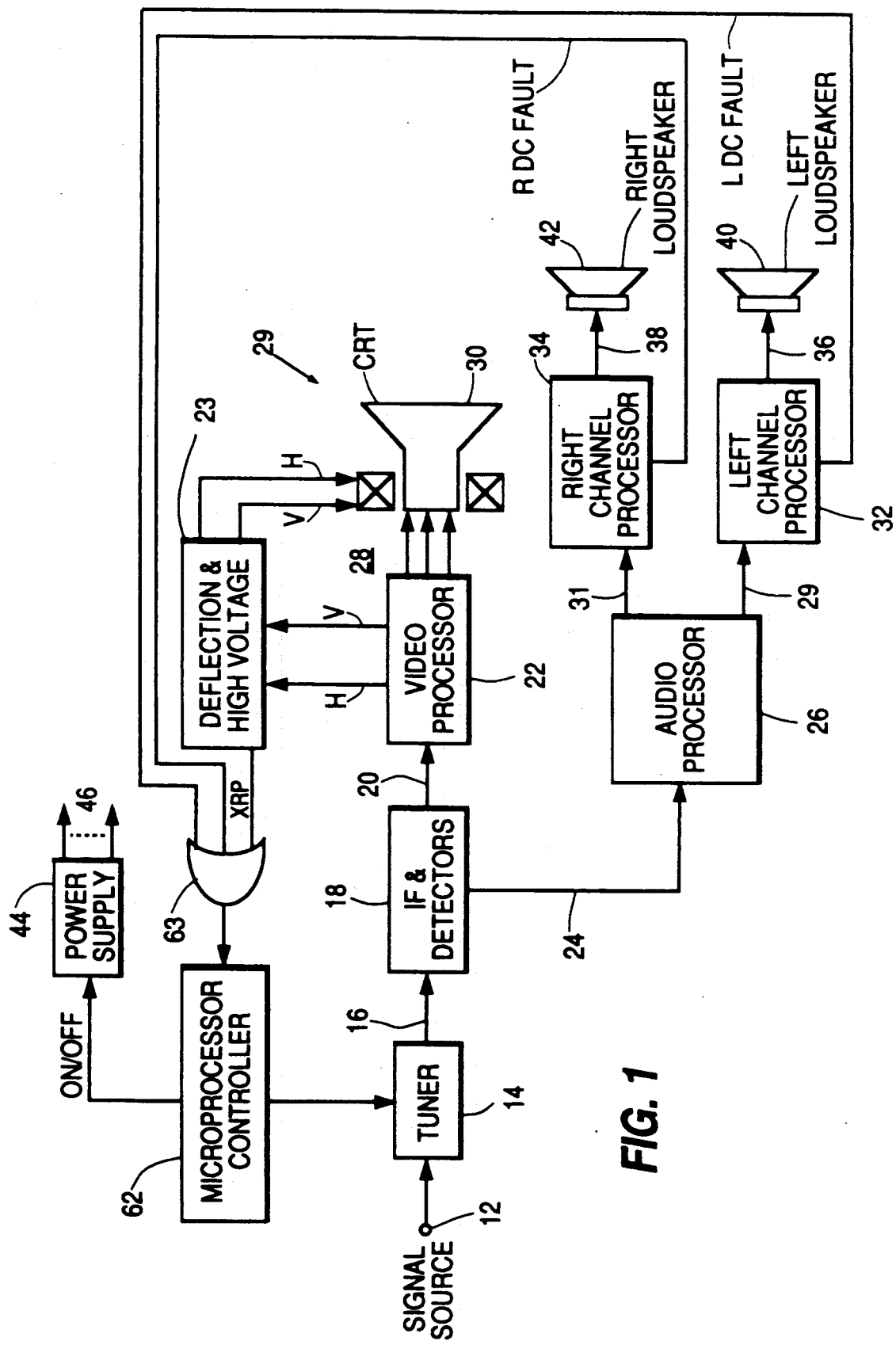
FIG. 1 shows a block diagram representation of a typical television receiver in which the present invention can be used.
Figure 2:
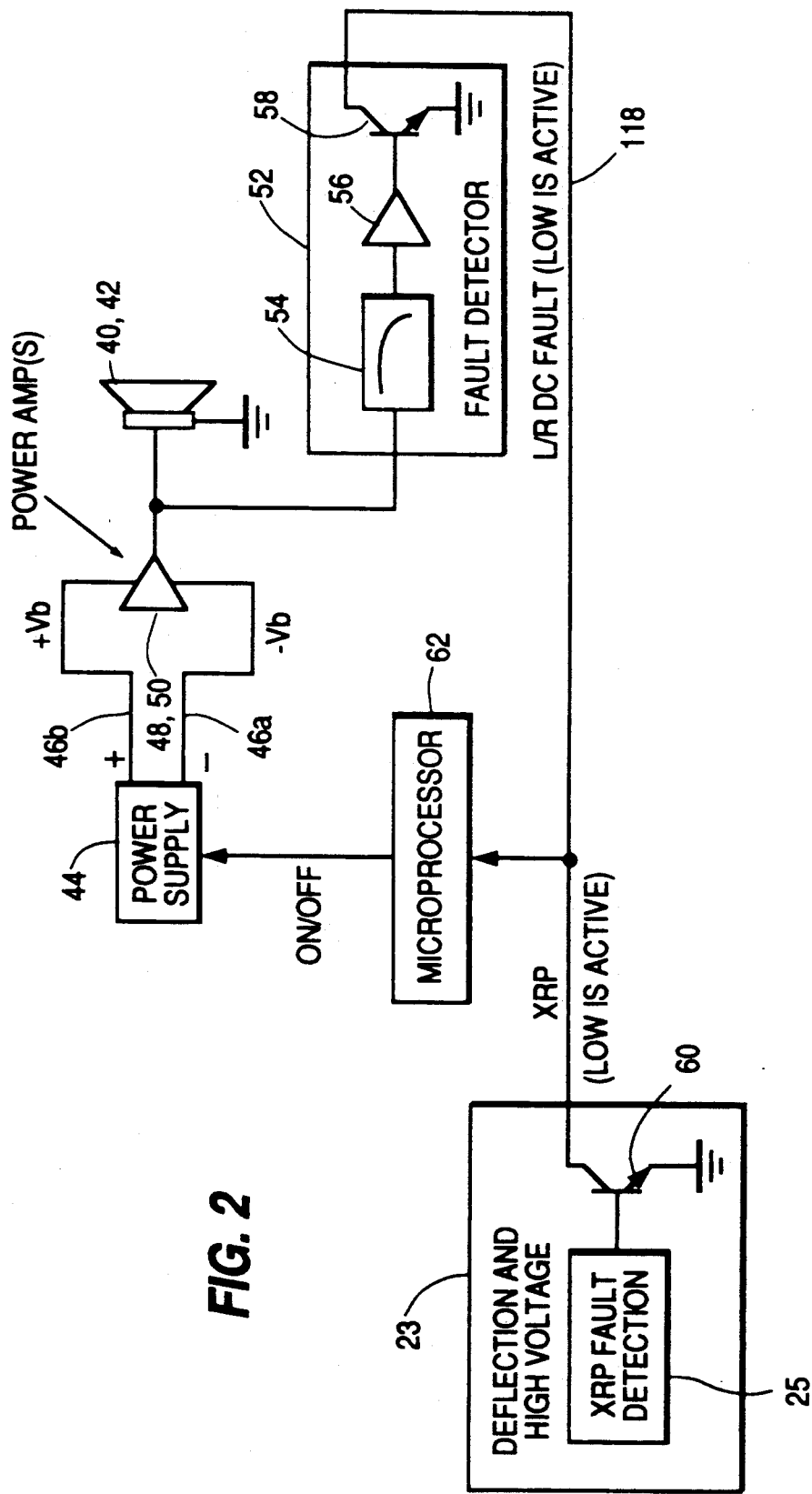
FIG. 2 shows a block diagram representation of an arrangement according to aspects of the present invention.

FIG. 1 shows an common television receiver arrangement. A television RF signal provided by a source, such as an antenna cable system, satellite receiver, VCR, or the like is received at input terminal 12 and coupled to tuner 14 in which the received signal is tunably selected and heterodyned using a mixer and a local oscillator (not shown) for producing an IF signal at output 16. The F signal is coupled to IF processor and detector 18 which produces a baseband video signal coupled via output 20 to video processor 22, and an audio signal coupled via output 24 to audio processor 26. Video processor 22 includes luminance, chrominance and synchronization &sync) processing circuits, and produces color video signals which are coupled via outputs 28 to CRT 30. Horizontal (H) and vertical (V) synchronization signals produced by video processor 22 are coupled to deflection and high voltage section 23 which produces horizontal (H) and vertical (V) deflection signals and ultor supply voltages for CRT 30. Audio processor 26 detects, amplifies, and matrixes the audio component included in the audio signal detected within section 18 to provide left and right channel audio signals at 29, 31 for amplification and processing by respective audio channel processors 32, 34 which include respective power amplifiers 48, 50 as shown in FIG. 2. Signals from processors 32, 34 are coupled via respective outputs 36, 38 to respective loudspeakers 40, 42. Power supply 44 receives power from an appropriate power source such as an AC power source or battery (not shown) and provides at terminals symbolically indicated as 46, various power supply voltages for powering the various set components discussed above. A microprocessor-based controller 62 controls various portions of the television receiver, such as tuner 14 and power supply 44.

Deflection and high voltage section 23, includes an X-ray protection circuit (not shown in FIG. 1) such as is commonly found in television receivers to protect against possibly unsafe conditions which may occur in the receiver, e.g., excessive kinescope beam currents or excessive kinescope ultor voltages, which may cause the generation of X-rays above permitted safety specifications when the electrons of the scanning beam strike the shadow mask and faceplate. A common course of action upon detection of such a condition is to shut down the horizontal deflection circuits which provide the power for the flyback circuit from which the ultor voltage is derived. In the alternative, as shown in FIG. 1, the power supply can be shut down thus shutting down the whole receiver including the horizontal deflection circuits. With the utilization of microprocessors, selective actions can be taken such as shutting down only certain selective circuits, or only certain portions of the main power supply or secondary power supplies. A suitable X-ray protection circuit is disclosed i U.S. Pat. No. 4,641,064 issued to Testin et al. for a "Television Power Supply Shutdown Circuit".

As indicated in FIG. 1, in response to the detection of a condition which may cause the generation of X-rays, the X-ray protection circuit of deflection and high voltage section 23 generates a respective signal, indicated as XRP in FIG. 1. The XRP signal is coupled to microprocessor controller 62 which, in the exemplary embodiment, is programmed to couple an "off" command to power supply 44. As a result, the receiver is turned "off" and the generation of potentially harmful X-ray is prevented.

In the television receiver shown in FIG. 1, advantageous additional use of the X-ray protection arrangement is made to protect left and right loudspeakers 40, 42 from the type of DC fault associated with the failure of power amplifiers 48, 50 within left and right audio signal channel processors 32, 34, respectively. Specifically, the output (L DC FAULT and R DC FAULT) signals of DC detectors within respective processors 32, 34 are coupled by virtue of an "OR" function circuit symbolically represented by "OR" gate 63 to the same input of microprocessor controller 62 as the X-ray protection signal (XRP). AS a result, if a DC fault is detected in the power amplifier of either of audio signal channel processors 32, 34, power supply 44 will be turned off and the respective one of loudspeakers 40, 42 will be protected. These aspects of the receiver shown in FIG. 1 will be explained in further detail with respect to FIGS. 2 and 3.

Figure 3:
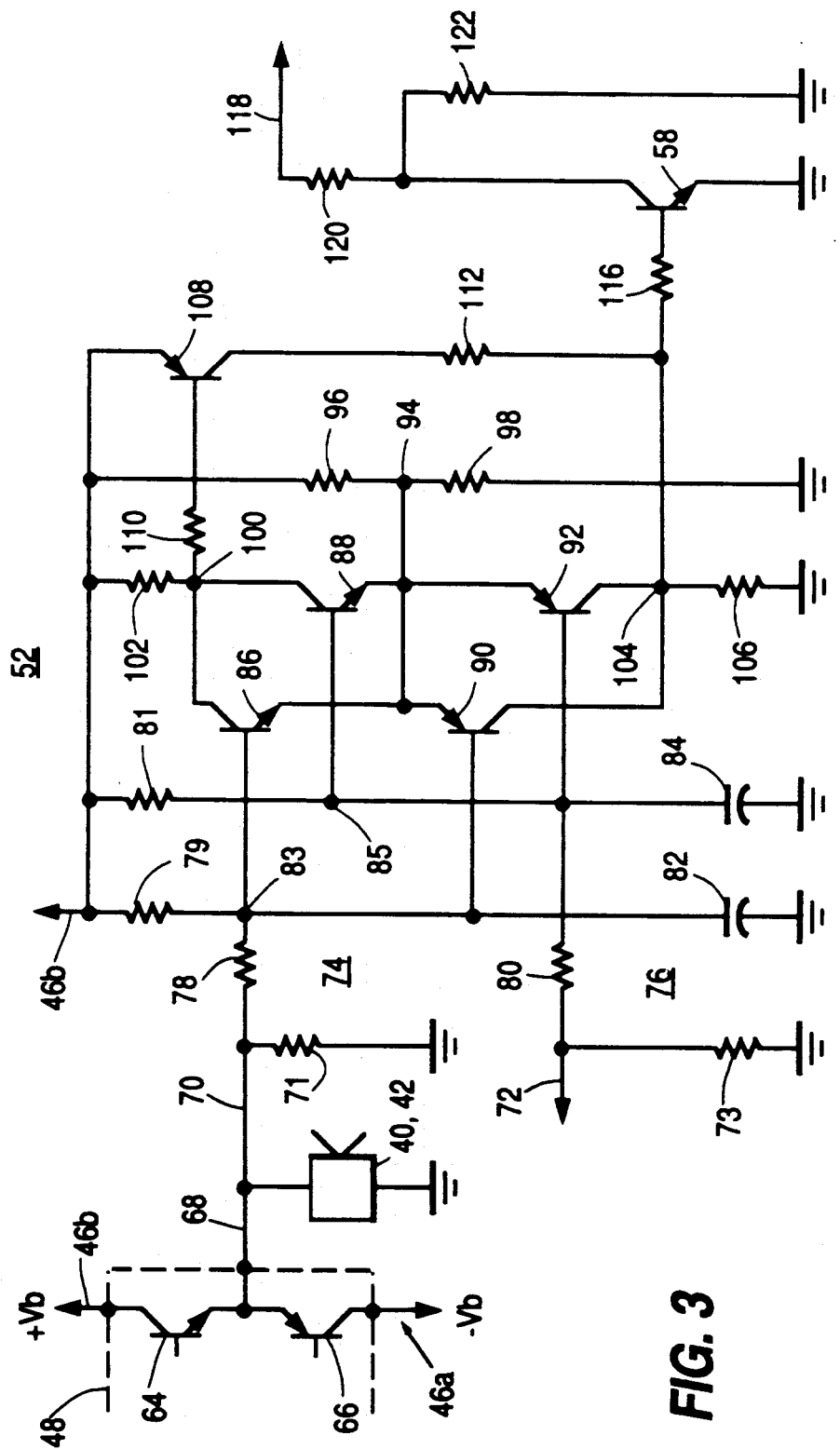
FIG. 3 shows a schematic of the low-pass filter, fault detector, and shut-down actuator of the arrangement of FIG. 2 according to certain other aspects of the present invention.

FIG. 2 shows a more detailed block diagram of portions of the television receiver shown in FIG. 1 with which the present invention is particularly concerned. While the arrangement for only one of audio signal processors 32, 34 is shown and described, a similar arrangement is used in the other processor. Power supply 44 provides left and right stereo power amplifiers 48, 50 with plus and minus power supply voltages with respect to ground via respective liens 46b and 46a. Power supply 44 as discussed in connection with the audio power amplifiers is a representative power supply and can comprise, e.g., the main power supply, or a secondary power supply derived from the main power supply or from the flyback transformer, or the like. Power amplifiers 48, 50 have complementary output transistors connected in series across the plus and minus power supply voltages with respective loudspeakers 40, 42 being DC coupled between respective junctions of the output transistors and ground. This is shown in FIG. 3 and will be discussed more completely hereinafter. The signal coupled to loudspeaker 40, 42 is also coupled to fault detector 52 which includes a low-pass filter 54 and a threshold detector 56. A normal audio signal coupled to loudspeaker 40, 42 is attenuated in low-pass filter 54 so that the detector is not "tripped" (triggered) by it. However, a steady DC signal passes through the filter and if the steady DC voltage is above or below a predetermined threshold, detector 56 will be actuated. The output signal of detector 56 is coupled to a transistor 58 such that when an output signal from detector 56 is coupled to the base electrode of transistor 58, the collector electrode will go "low".

Figure 4:
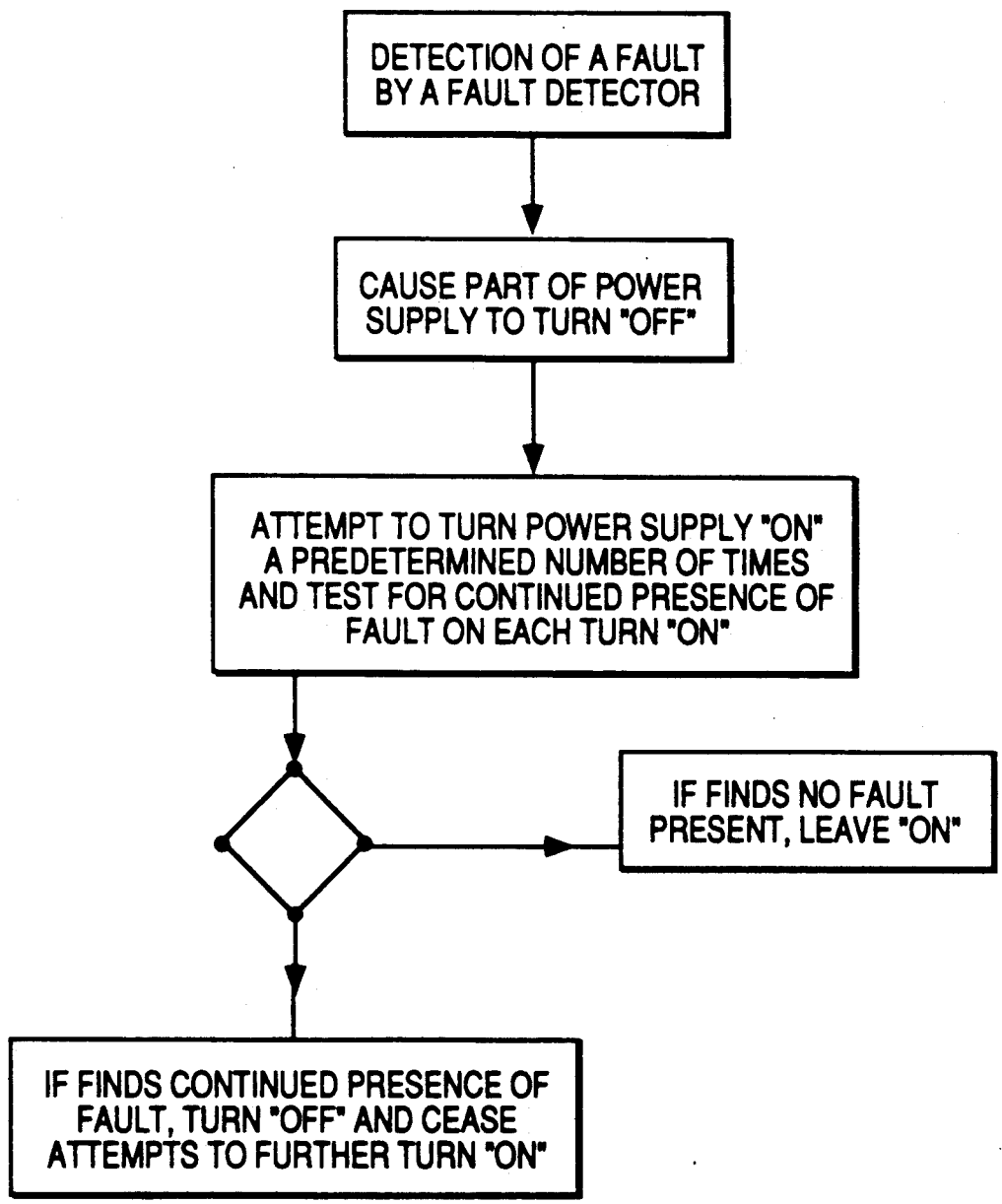
FIG. 4 is a flow chart of a portion of the turn-off operational functions performed by the microcontroller of FIGS. 1 and 2.

Transistor 60 is symbolic of the output of X-ray protection circuitry 25 of deflection and high voltage section 23. Transistor 60 is rendered conductive in response to a parameter which is indicative of the possible generation of excessive X-rays. The collector electrode of transistor 60 going "low" causes the appropriate signal input of microprocessor 62 to go "low". As earlier noted, in the exemplary embodiment, microprocessor 62 is programmed to shut-down power supply 44. In the exemplary embodiment, as shown in FIG. 4, microprocessor 62 is programmed to shutdown the power supply 44 and to attempt to turn the receiver back on a predetermined number of times. If the fault is still detected after the predetermined number of tries, then microprocessor 62 will keep the receiver turned off. As shown in FIG. 2, the collector electrode of transistor 58 is coupled to the input signal line of microprocessor 62 such that a "low" signal from transistor 58 is acted upon as if there was a determination of an X-ray protection fault, and microprocessor 62 is actuated to take its programmed action to protect against excessive X-ray generation, e.g., turn power supply 44 "off". As a result, power supply voltages +Vb and −Vb are removed from power amplifiers 48, 50.

Referring now to FIG. 3, there is shown a detailed schematic of fault detector 52. Complementary audio power output transistors 64 (NPN) and 66 (PNP) of power amplifiers 48, 50 have their emitter electrodes coupled together and their collector electrodes respectively coupled to positive voltage (+Vb) power supply lead 46b and negative voltage (−Vb) power supply lead 46a. Power amplifiers 48, 50, may be incorporated with an integrated circuit such as a uPC1188H which is available from the NEC Corp. of Japan. Alternately, discrete devices may be used. When discrete output transistors are used, it is not uncommon that thermal stabilizing components, such as resistors, may be inserted in the emitter circuits of the discrete devices.

Loudspeaker 40, 42 is coupled between junction 68 of the emitter electrodes and ground. The steady state voltage developed at junction 68 is a voltage between the plus supply voltage +Vb (e.g., +12 volts) and the minus supply voltage −Vb (e.g., −12 volts). Ideally, if transistors 64, 66 are properly matched and biased, terminal 68 will have a quiescent voltage of zero volts with respect to ground and no DC current will flow through loudspeaker 40, 42. However, transistors 64 and 66 are seldom perfectly matched over their dynamic range or perfectly biased at their base electrodes so that often there is some nominal, but relatively small, DC current flowing through loudspeaker 40, 42.

Fault detector 52 has two input terminals 70, 72, one for each each channel. The combination of the signal and DC voltage present at each of the input leads 70, 72 is coupled to a respective low pass filter 74, 76 comprising respective resistors 78, 80 and capacitors 82, 84. In the exemplary embodiment, rsistors 78, 80 are each 220 Kohms and capacitors 82, 84 are each 4.7 microfarads such that the cross-over frequency is well below 20 Hz. Junction 83 between resistor 78 and capacitor 82, as well as junction 85 between resistor 80 and capacitor 84 are coupled to power supply terminal 46b through respective resistor 79 and 81 (also 220 Kohms) chosen so that junctions 83 and 85 are about +Vb/2 above ground, or in the exemplary embodiment, +6 volts above ground. The 220 Kohm resistance of resistors 78, 80 is substantially larger than the approximately 8 ohm resistance of loudspeaker 40, 42 such that any bias current coupled back to loudspeakers 40, 42 from junction 83, 85 is negligible. Resistors 72, 73 shunt respective loudspeakers 40, 42 to ground and provide a DC return to ground for their respective input terminals 70, 72 in the absence of loudspeakers 40, 42. The resistance values of resistors 71, 73 are much larger than the internal Dc resistance of loudspeakers 40, 42, e.g., 3.2 ohms Dc for a loudspeaker rated at 8 ohms, and thus do not change the operation of the circuit.

The low-pass filtered signal from input terminals 70, 72 is coupled to the base electrodes of respective complementary pairs of transistors 86, 90, and 88, 92, with transistors 86, 90 being paired for one channel and transistors 88, 92 being paired for the other channel. The emitter electrodes of transistors 86, 88, 90, and 92 are all coupled together to a common terminal 94 which is at +6 volts (the same voltage as junctions 83, 85) by virtue of voltage divider resistors 96, 98 coupled between the plus power supply voltage +Vb at terminal 46b and ground. Thus, the base electrodes of NPN transistors 86, 88 and PNP transistors 90, 92 are placed at +6 volts by respective voltage divider 79, 78 and 81, 80 and the emitter electrodes are placed at +6 volts by resistor divider 96, 98. If the voltage at one of the junctions 83, 85 is raised above the Vbe (0.7 volts) of NPN transistors 86, 88, the conduction threshold of the respective transistors 86, 88 is exceeded and that transistor is caused to conduct. In a like manner, if the voltage at one of the junctions 83, 85 is lowered by the Vbe (0.7 volts) of PNP transistors 90, 92, the conduction threshold of the respective transistor is exceeded and that transistor is caused to conduct. However, since resistors 78 and 79 as well as resistors 80 and 81 from a 2:1 voltage divider for the DC voltage at respective terminals 70, 72, the respective transistors will start to conduct for a change of 1.4 volts in the respective directions.

Resistors 78 and 79 in combination with capacitor 82, and resistors 80 and 81 in combination with capacitor 84 provide a charging time constant for a DC voltage appearing at junctions 70, 72 to appear at respective junctions 83, 85 for causing the transistors coupled to the respective junction to conduct in a manner discussed above. This is desirable so that the circuit will not react to momentary DC transients and thus falsely indicate a fault.

The collector electrodes of NPN transistors 86, 88 of the two channels 32, 34 are connected together at junction 100 which is coupled to plus power supply source line 46b by resistor 102. In a like manner, PNP transistors 90, 92 of the two channels have their collector electrodes connected together at junction 100 is coupled to the base electrode of transistor 108 through resistor 110. The emitter electrode of transistor 108 is coupled to power supply voltage +Vb at terminal 46b, and the collector electrode is coupled to junction 104 by resistor 112.

Since the voltage at junction 100 goes lower (less positive) when the NPN transistors 86, 88 detect a positive going fault at respective junctions 70, 72, and the voltage at junction 104 goes higher (more positive) when the PNP transistors 90, 92 detect a negative going fault at respective junctions 70, 72, phase inverting PNP transistor 108 is included for changing the fault indicating voltage change of NPN transistors 86, 88 so that all fault indications for both detector portions are the same. In this way, all fault indicating voltages at junctions 70, 72, whether plus or minus, result in a rise of voltage at junction 104.

Referring to FIG. 2, the X-ray protection circuitry of the television receiver was designed to go "low" upon sensing a fault. Accordingly, the output of detector shown in FIG. 3, should also go "low" upon detection of a fault for compatibility. Since the voltage at junction 104 goes "high" upon detection of a fault, phase inverter transistor 58 is utilized. The fault indicating voltage change at junction 104 is coupled to a base electrode of transistor 58 through a resistor 116, and an output signal indicative of a fault being detected in the audio system is coupled to bus 118 (FIG. 2) at the collector electrode of transistor 58 via a network including series resistor 120 and shunt resistor 122.

As earlier noted, in the exemplary embodiment, the ratio of the divider resistors 78 and 79, and resistors 80, 81 are equal or provide a 2:1 ratio such that one half of the plus power supply voltage appears at junctions 83, 85. Thus, the voltage at junction 94 provided by divider resistors 96, 98 corresponds to the voltage at junctions 83 and 85. This correspondence between both resistor divider voltages can be used to adjust the sensitivity, or the amount of DC voltage which is required at junctions 70, 72 in order for a fault to be indicated. For example, if the divider ratio were such that resistor 78 was twice the value of resistor 79, then any change of fault voltage at terminal 70 would be divided by one third and it would require 2.1 volts Dc across loudspeaker 40 in order to translate to a change of 0.7 volts at junction 83. However, the DC quiescent voltage at junction 83 would then be two thirds of the 12 volts +Vb or 8.0 volts. In such a case, the voltage at junction 94 would also be set to 8.0 volts.

With the voltages at junctions 83, 85 and 94 being the same, the plus and minus fault voltages across loudspeaker 40, 42 are symmetrical in each direction and a full Vbe must be developed in each direction for the respective transistors to conduct and detect a fault. However, if the voltage at junction 94 were less than the voltage at junction 83 thus providing part of the threshold voltage, then less of an increase in voltage would be needed at junction 83 in order for detection to occur. Of course, in such a case, the threshold voltage for the PNP transistors would be increased and there would be a loss of symmetry. However, the threshold symmetry for plus and minus fault voltages can be maintained by the inclusion of forward poled diodes or zener diodes in series with the emitter electrodes of the transistors 86, 88, 90, 92. The threshold voltage required for detection can be changed in the same manner. This change in threshold can be coordinated with a change of the ratio of resistor dividers 78, 79 and 80, 92.

We claim:

1. In a television system having a video section for processing a video signal, a deflection section for scanning an image representative of the video signal onto a CRT display screen, an audio section for processing an audio signal, and a power supply means for supplying operation voltages to said video, deflection, and audio sections comprising:
   means for amplifying the audio signal and driving a loudspeaker included in said audio section,
   first means for detecting a fault in said deflection section,
   means for shutting down said power supply means in response to detection of a fault in the deflection section,
   second means for detecting a fault in the means for amplifying the audio signal, and
   means for actuating the means for shutting down in response to the detection of a fault by the second detection means.

2. The system of claim 1 wherein the deflection section includes means for generating an ultor voltage for the CRT and the first detecting means is coupled to said ultor voltage generating means.

3. The system of claim 2 wherein the first detecting means includes means for detecting conditions corresponding to the generation of excessive X-rays.

4. The system of claim 2 wherein the means for shutting down comprises a microprocessor controller which upon detection of the deflection section fault causes the power supply means to be shut down.

5. The system of claim 1 wherein said second means for detecting comprises a low pass filter and a threshold detector.

6. The system of claim 5 wherein the second means for detecting further comprises a DC detector coupled to the loudspeaker.

7. The system of claim 1 wherein the audio section comprises a plurality of channels, the amplifying mans comprises a plurality of amplifiers in respective ones of the channels, and the second means for detecting comprises a plurality of detectors one for a respective one of the channels, each of the plurality of detectors having an input coupled to the respective one of the channels and an output, the outputs being coupled to the means for actuating.

8. In a television system having a video section for processing a video signal, a deflection section for scanning an image representative of the video signal onto a CRT display screen, an audio section for processing an audio signal, and a power supply section for supplying operation voltages to said video, deflection, and audio sections comprising:
   means for amplifying the audio signal and driving a loudspeaker included in said audio section,
   first means for detecting a fault in said deflection section,
   means for shutting down at least a portion of the television system tin response to detection of a fault in the deflection section, the means for shutting down comprising an X-ray protection means coupled to a microprocessor which in turn is coupled to at least a portion of the power supply means of the television system, the microprocessor being programmed upon detection of a deflection section fault to turn the receiver "on" a predetermined number of times and test to see if the fault is still present, and if still present, to cease attempting to turn the receiver "on",
   second means for detecting a fault in the audio section, and
   means for actuating the means for shutting down in response to the detection of a fault of the second detection means.

9. In a television system having a video section for processing a video signal, a deflection section for scanning an image representative of the video signal onto a CRT display, an audio section for processing an audio signal, and power supply means for supplying operation voltages to said video, deflection, and audio sections comprising:
   means for amplifying the audio signal and driving a loudspeaker included in said audio section,
   first means for detecting a fault in said deflection section,
   means coupled to said power supply means for shutting down at least a portion of the power supply means in response to the detection of a fault in the deflection section, second means for detecting a fault in the means for amplifying the audio signal, said second means comprising a low-pass filter and a threshold voltage detection means, and means for actuating the means for shutting down in response to the detection of a fault of the second detection means.

10. The apparatus of claim 9 wherein the second means for detecting includes means for adjusting a threshold at which a fault will be detected.

11. The apparatus of claim 9 wherein the means for adjusting the threshold at which a fault will be detected is included n the low pass filter.

12. In a television system having a video section for processing a video signal, a deflection section for scanning an image representative of the video signal onto a CRT display screen, an audio section for processing an audio signal, and a power supply means for supplying operation voltages to said video, deflection, and audio sections comprising:

means for amplifying the audio signal and driving a loudspeaker included in said audio section, first means for detecting a fault in said deflection section, means coupled to said power supply for shutting down at least a portion of the deflection section response to the detection of a fault in the deflection section, second means for detecting a fault in the means for amplifying, said second means for detecting comprising low-pass filter including a series resistor and a shunt capacitor, threshold voltage means comprising a bias means, the series resistor, and a semiconductor device having a threshold of conduction, the series resistor, the shunt capacitor, and the bias means determining the length of time of a predetermined period of time, the series resistor and the bias means providing a sensitivity adjustment for the threshold value of the fault which will be detected, and means for actuating the means for shutting down in response to the detection of a fault by the second detection means.

* * * * *